United States Patent
Fulton et al.

(10) Patent No.: US 10,634,086 B1
(45) Date of Patent: Apr. 28, 2020

(54) SYSTEM AND METHOD FOR ESTIMATING CYLINDER PRESSURES

(71) Applicant: Ford Global Technologies, LLC, Dearborn, MI (US)

(72) Inventors: Brien Fulton, Bloomfield Hills, MI (US); Hoon Cho, Rochester, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/227,952

(22) Filed: Dec. 20, 2018

(51) Int. Cl.
*F02M 7/00* (2006.01)
*F02D 41/40* (2006.01)
*F02D 13/02* (2006.01)

(52) U.S. Cl.
CPC ....... *F02D 41/401* (2013.01); *F02D 13/0276* (2013.01); *F02D 2200/024* (2013.01); *F02D 2200/1012* (2013.01)

(58) Field of Classification Search
CPC ..... F02D 2200/0611; F02D 2200/0618; F02D 2200/00; F02D 41/045; F02D 41/06; F02D 41/062; F02D 41/064; F02D 41/065; F02D 41/107; F02D 41/34; F02D 41/3827; F02D 41/40; F02D 41/401; F02D 41/402; F02D 1/16; F02D 41/061; F02D 41/345; F02D 41/365; F02D 2001/0085; F02D 2700/10; F02M 41/123; F02M 41/1411
USPC ........................ 123/434, 435, 675, 677, 502
See application file for complete search history.

(56) References Cited

U.S. PATENT DOCUMENTS

| | | | |
|---|---|---|---|
| 5,170,343 A * | 12/1992 | Matsuda | B60G 17/0185 700/79 |
| 7,159,551 B2 | 1/2007 | Cecur et al. | |
| 7,167,793 B1 | 1/2007 | Gibson et al. | |
| 7,404,383 B2 | 7/2008 | Elendt | |
| 9,605,603 B2 | 3/2017 | Glugla et al. | |
| 10,066,565 B2 | 9/2018 | Barth et al. | |
| 2014/0074386 A1 * | 3/2014 | McGee | B60W 50/0097 701/113 |
| 2017/0113675 A1 * | 4/2017 | Oguri | B60W 10/06 |
| 2017/0120892 A1 * | 5/2017 | Kato | B60W 20/14 |
| 2019/0136791 A1 * | 5/2019 | Kurtz | F02D 35/023 |

\* cited by examiner

*Primary Examiner* — John Kwon
(74) *Attorney, Agent, or Firm* — Geoffrey Brumbaugh; McCoy Russell LLP

(57) ABSTRACT

Methods and systems for operating an engine and determining relative compression ratio differences from a reference cylinder are disclosed. In one example, an engine is rotated via a starter or another type of electric machine and engine deceleration rates related to each engine cylinder are determined. The engine deceleration rates form a basis for compression ratio factors for each engine cylinder.

20 Claims, 5 Drawing Sheets

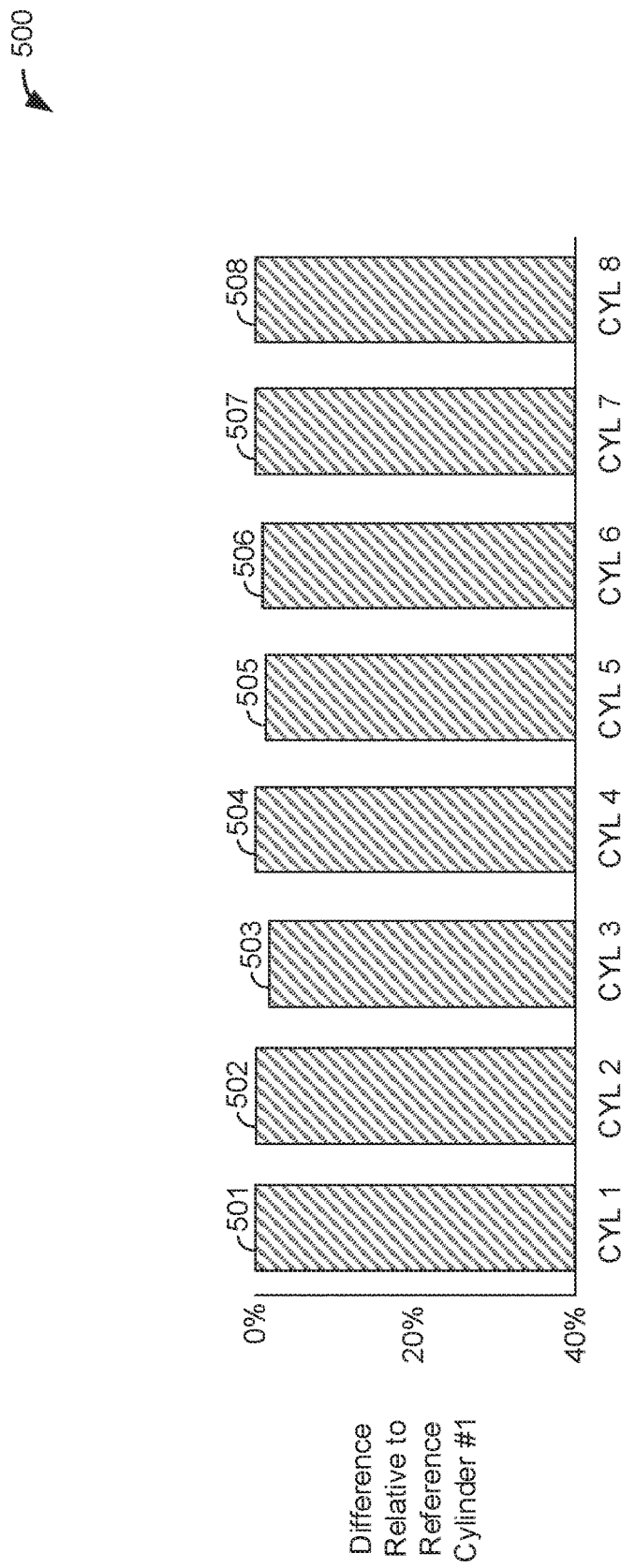

US 10,634,086 B1

SYSTEM AND METHOD FOR ESTIMATING CYLINDER PRESSURES

BACKGROUND/SUMMARY

An engine may include a plurality of cylinders to combust fuel and deliver propulsive power to a vehicle. All cylinders of an engine may be configured to have a same compression ratio, but all of the cylinders may not have a same compression ratio due to piston to cylinder clearance variation, piston dimensional variations, and other conditions. The compression ratio differences may affect peak cylinder pressures when the engine is combusting fuel, and variation of cylinder pressure from a desired cylinder pressure may reduce engine fuel economy, reduce engine torque, and reduce engine output power. Thus, it may be desirable to determine and control pressures in cylinders to improve engine performance and emissions. One way to determine pressures in engine cylinders is to install a pressure sensor in each engine cylinder. However, adding a pressure sensor to each engine cylinder can increase engine cost. Therefore, it may be desirable to provide a way of determining cylinder pressure without having to install a pressure sensor in each engine cylinder.

The inventors herein have recognized the above-mentioned disadvantages and have developed an engine operating method, comprising: adjusting a cylinder pressure control actuator of an engine via a controller based on a cylinder compression ratio estimated from a deceleration rate of the engine.

By adjusting a cylinder pressure actuator based on a compression ratio estimated from a deceleration rate of an engine, it may be possible to provide the technical result of optimizing engine cylinder pressure control without having to install a pressure sensor in each cylinder. In particular, one engine cylinder may be instrumented with a pressure sensor while all other engine cylinders do not have pressure sensors. The one cylinder that has the pressure sensor may be referred to as a reference cylinder. A deceleration rate of the engine during a compression stroke of the reference cylinder may allow pressure in the reference cylinder and compression ratio of the reference cylinder to be correlated to the deceleration rate of the engine during the compression stroke of the reference cylinder. The correlation may be expressed as a compression factor and deceleration rates observed during compression strokes of other engine cylinders may then be related to the relationship between engine deceleration rate and cylinder pressure for the reference cylinder to determine compression factors for the other cylinders that do not include pressure sensors. The compression factors for the cylinders that do not include pressure sensors may provide a basis for adjustments that affect cylinder pressure in the cylinders without pressure sensors. For example, start of fuel injection time for a cylinder during an engine cycle, end of fuel injection time for the cylinder during the engine cycle, and amount of fuel injected to the cylinder during the engine cycle may be adjusted to control pressure in a cylinder without a pressure sensor to optimize engine power, torque, and fuel economy.

The present description may provide several advantages. In particular, the approach may improve pressure control for engine cylinders. In addition, the approach may be applied at a lower cost than approaches where a pressure sensor is included in each engine cylinder. Further, the approach may improve engine power, fuel economy, and torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 5 shows example cylinder compression ratio differences relative to a reference cylinder.

DETAILED DESCRIPTION

Figure 1:
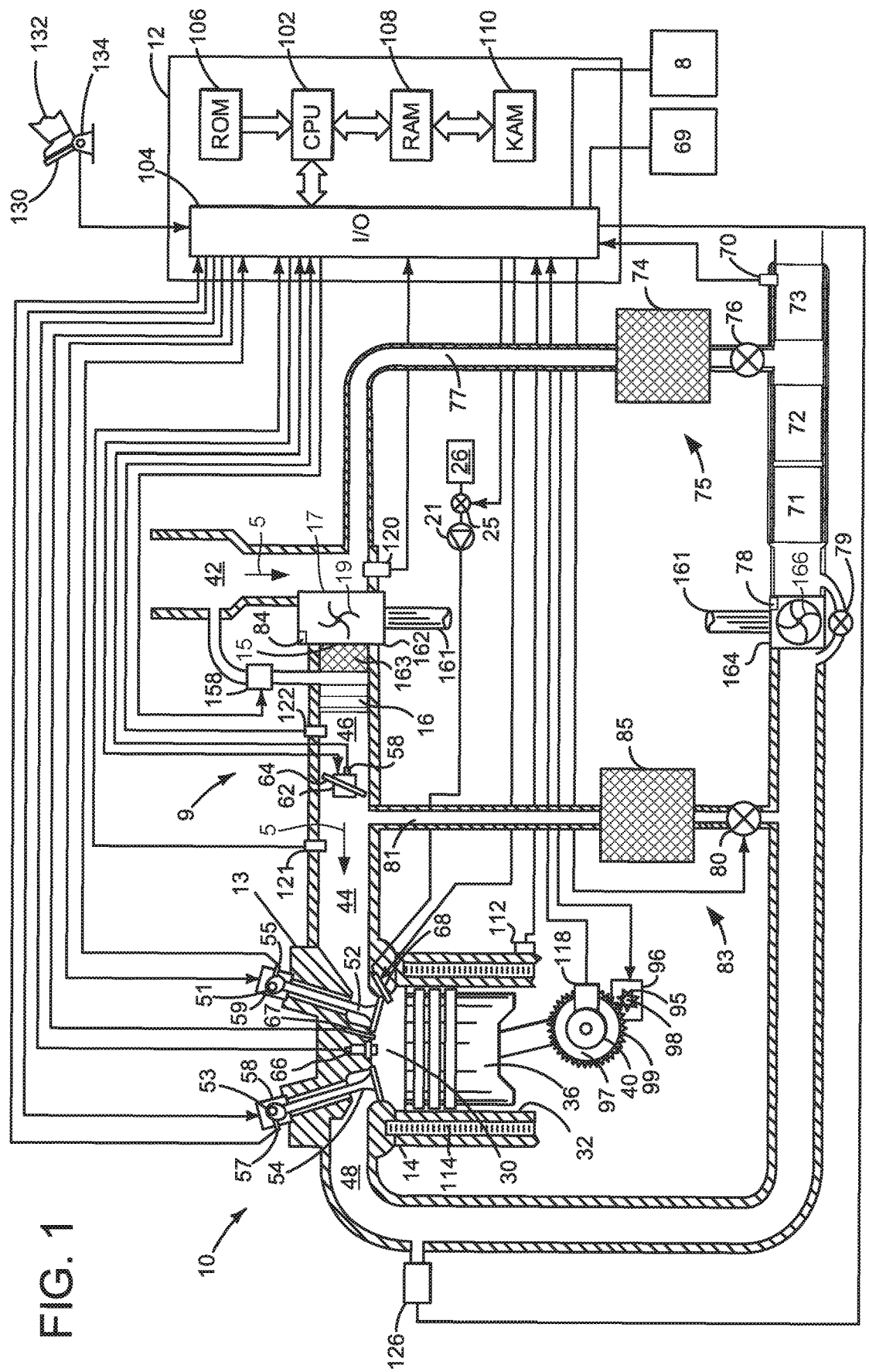
FIG. 1 shows a detailed schematic depiction of an example engine.
Figure 2:
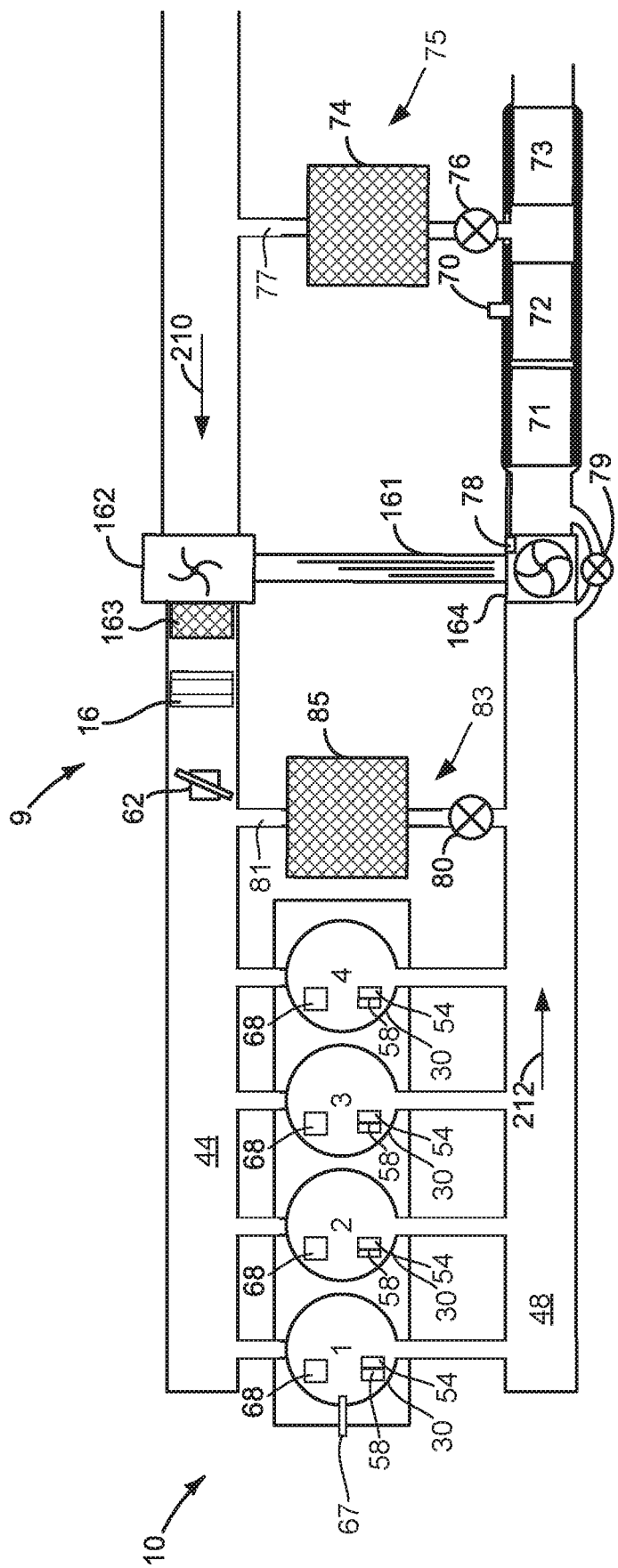
FIG. 2 shows an example engine system configuration for an engine with a plurality of cylinders.
Figure 3:
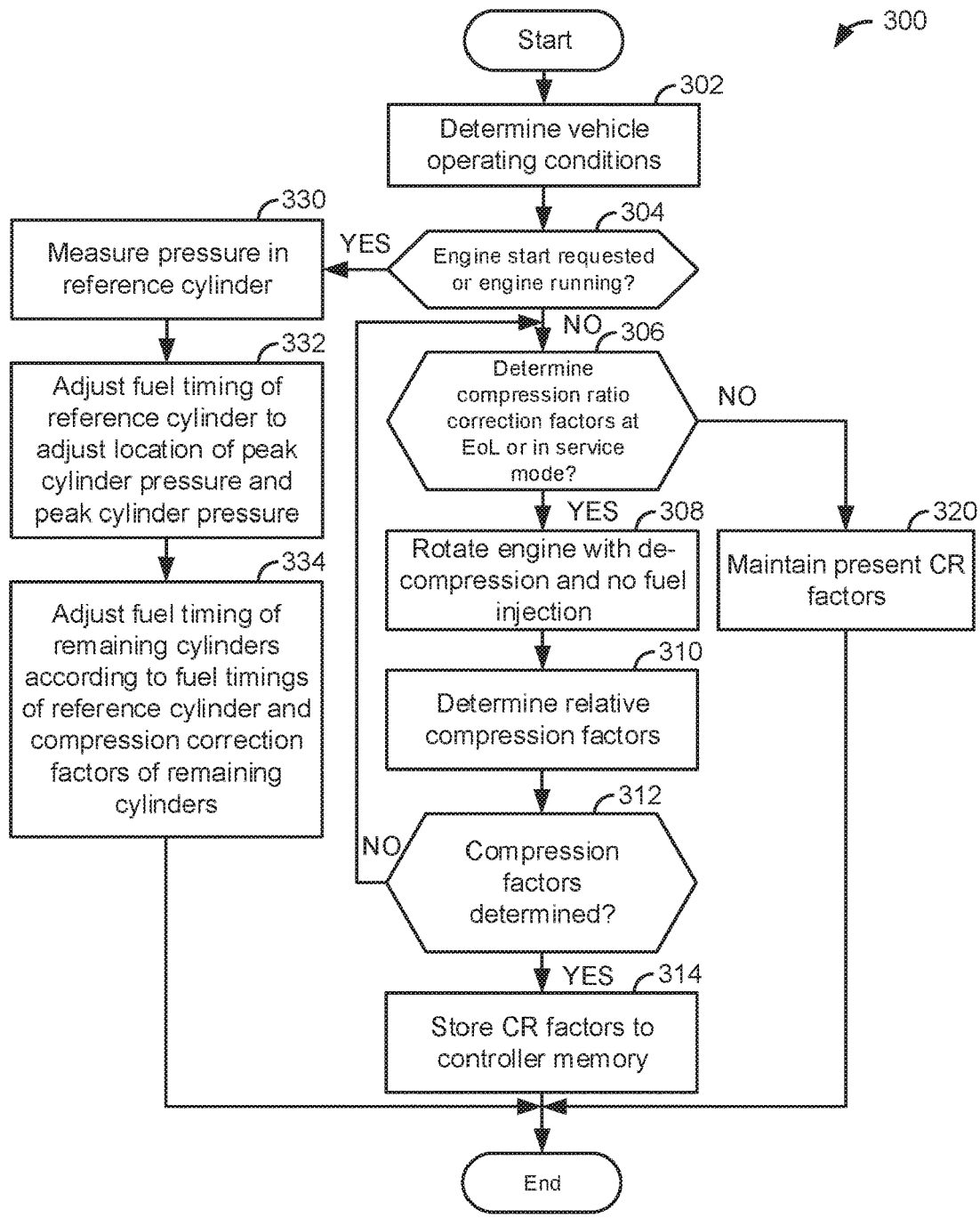
FIG. 3 shows an example method for operating an engine.
Figure 4:
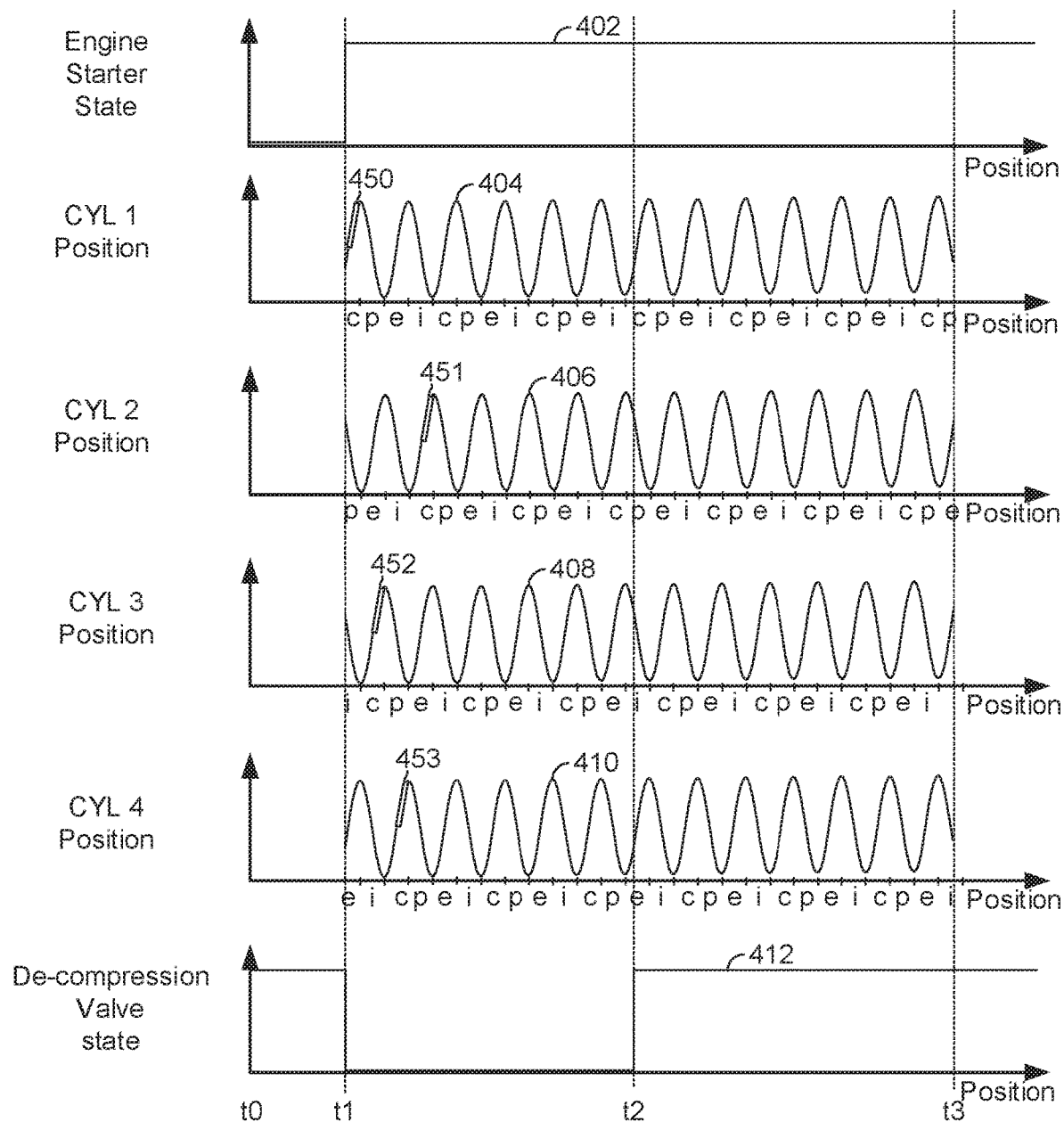
FIG. 4 shows plots of an engine operating sequence according to the method of FIG. 3.

The present description is related to operating an engine that includes a pressure sensor. FIG. 1 shows one example of a boosted diesel engine that includes a pressure sensor. The single pressure sensor may provide a basis for estimating compression ratios and/or compression factors of cylinders that do not include pressure sensors. FIG. 2 shows a non-limiting example of the engine shown in FIG. 1 that includes a plurality of cylinders. A method for operating the engine is shown in FIG. 3. The engine of FIGS. 1 and 2 may operate as shown in FIG. 4 according to the method of FIG. 3. Example relative compression ratio differences for an eight cylinder engine are shown in FIG. 5.

Referring to FIG. 1, internal combustion engine 10, comprising a plurality of cylinders, one cylinder of which is shown in FIG. 1, is controlled by electronic engine controller 12. The controller 12 receives signals from the various sensors of FIGS. 1 and 2. Controller 12 employs the various actuators of FIGS. 1 and 2 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). A rocker stop device 58 may be included with exhaust poppet valve 54 to hold the exhaust valve open over an entire cycle of the engine. The rocker stop device 58 may be referred to as a de-compression valve actuator. The combination of exhaust valve 54 and rocker stop device 58 may be referred to as a de-compression valve. Flow of fuel supplied to cylinder 30 may also cease when rocker stop device 58 holds exhaust valve 54 open.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine 165 is also shown coupled to shaft 161. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature.

Emissions device 71 can include an oxidation catalyst and it may be followed by a diesel particulate filter (DPF) 72 and a selective catalytic reduction (SCR) catalyst 73, in one example. In another example, DPF 72 may be positioned downstream of SCR 73. Temperature sensor 70 provides an indication of SCR temperature.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Engine 10 may be included in a variety of configurations, one of which is shown in FIG. 2. The various engine configurations may include all or only a fraction of the components that are shown in FIG. 1. Numeric labels for engine 10 and its associated components are maintained in FIG. 2. Further, components shown in FIG. 1 and that are included in FIG. 2 operate as described according to FIG. 1 and are labeled with the same numeric labels. Therefore, for the sake of brevity, the description of these elements will not be repeated.

Referring now to FIG. 2, engine 10 is shown with four individual cylinders 30 that are numbered 1-4. In this example, engine 10 includes a single cylinder pressure sensor 67, which protrudes into cylinder number 1. Cylinders 2-4 do not include pressure sensors. Each of cylinders 1-4 also includes a fuel injector 68, a rocker stop device (e.g., de-compression actuator) 58, and exhaust valve 54. The fuel injectors 68 of one cylinder may be controlled independently from fuel injectors 68 of the other engine cylinders.

Thus, the system of FIGS. 1 and 2 may provide for an engine system, comprising: a diesel engine including a cylinder with a pressure sensor and plurality of cylinders without pressure sensors, the diesel engine also including a plurality of fuel injectors; and a controller including executable instructions stored in non-transitory memory to adjust timing of at least one of the plurality of fuel injectors in response to a compression factor that is related to a deceleration rate of the diesel engine. The engine system includes where the cylinder is a reference cylinder that is a basis for determining compression factors for cylinders of the diesel engine other than the reference cylinder. The engine system includes where the deceleration rate is measured during a compression stroke of a cylinder. The engine system includes where adjusting timing of the at least one of the plurality of fuel injectors includes adjusting a start of injection time for a cylinder for a cycle of the engine. The engine system includes where adjusting timing of the at least one of the plurality of fuel injectors includes adjusting an end of injection time for the cylinder for the cycle of the engine.

Referring now to FIG. 3, a method for operating an engine is shown. In particular, a flowchart of a method for operating an internal combustion engine is shown. The method of FIG. 3 may be stored as executable instructions in non-transitory memory in systems such as shown in FIGS. 1 and 2. The method of FIG. 3 may be incorporated into and may cooperate with the systems of FIGS. 1 and 2. Further, at least portions of the method of FIG. 3 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 300 may determine selected control parameters from sensor inputs.

At 302, method 300 determines vehicle operating conditions. Vehicle operating conditions may include but are not limited to engine temperature, accelerator pedal position, ambient temperature, engine starting requests, ambient pressure, driver demand torque, and engine speed. Vehicle operating conditions may be determined via vehicle sensors and the engine controller described in FIG. 1.

At 304, method 300 judges if an engine start is requested or if the engine is running (e.g., combusting fuel and rotating). In one example, method 300 may judge that an engine start is requested based on a position of a key switch or state of a pushbutton. Alternatively, an engine start request may be generated based on transmission gear selected, driver demand torque, and brake pedal position. Method 300 may judge that the engine is running if the engine is combusting fuel and rotating under its own power. If method 300 judges that an engine start is requested or that the engine is running, the answer is yes and method 300 proceeds to 330. Otherwise, the answer is no and method 300 proceeds to 306.

At 330, method 300 measures pressure in a reference cylinder (e.g., an only cylinder of the engine that includes a pressure sensor). The cylinder pressure is measured during a compression stroke of the reference cylinder. Further, method 300 may measure pressure in an expansion or power stroke of the engine to determine the location of peak pressure in the cylinder for the present cylinder cycle. Method 300 proceeds to 332.

At 332, method 300 adjusts fuel injection timing for the reference cylinder based on the location of peak cylinder pressure that was observed at 330. In one example, method 300 adjusts start of fuel injection timing so that location of peak cylinder pressure is at a predetermined crankshaft angle (e.g., 15 crankshaft degrees after top-dead-center compression stroke for the reference cylinder). The start of injection timing for the reference cylinder may be advanced if the location of peak pressure for the reference cylinder is after the predetermined crankshaft angle. The start of injection timing for the reference cylinder may be retarded if the location of peak pressure for the reference cylinder is before the predetermined crankshaft angle. Further, method 300 may adjust the amount of fuel injected in response to the peak pressure observed at 330. For example, if the peak pressure determined at 330 is less than expected, then the amount of fuel injected to the reference cylinder may be increased. If the peak pressure determined at 330 is greater than expected, then the amount of fuel injected to the reference cylinder may be decreased. Further still, the end of fuel injection timing for the reference cylinder may be adjusted when the start of injection and/or the amount of fuel injected into the reference cylinder is adjusted. Additionally, or alternatively, method 400 may also adjust other actuators that may affect cylinder pressure in the reference cylinder. For example, an amount of energy that is supplied to a glow plug or cam timing may be adjusted to modify the location of peak pressure (e.g., crankshaft angular location of a highest pressure or pressure that is greater than other pressures observed in the cylinder during a cycle of the cylinder) in the reference cylinder.

In one example, a table or function of desired locations for peak cylinder pressure of the reference cylinder are stored in controller memory and the cylinder pressure control routine within the controller adjusts fuel injection timings to achieve the desired locations and values of peak cylinder pressure for the reference cylinder. Adjustments may be provided to the peak cylinder pressure crankshaft locations for fuel cetane number, engine temperature, and ambient temperature. Method 300 proceeds to 334.

At 334, method 300 adjusts fuel injection timing for the non-reference cylinders based on the location of peak cylinder pressure that was observed at 330 and the compression factors or the compression ratios of the respective cylinders. For example, if cylinder number one is the reference cylinder, pressure in cylinder number two may be adjusted via adjusting fuel injection timing, camshaft timing, or an amount of energy that is supplied to a glow plug via the compression factor determined for cylinder number two. In one example, one or more tables or functions of empirically determined fuel injection start of injection time for a cylinder cycle, fuel injection amount, end of injection time, camshaft timing adjustments, or an amount of energy that is supplied to a glow plug values for a cylinder may be referenced via the value of the compression factor or the compression ratio of the cylinder whose actuator is being adjusted. The tables or functions output adjustments for fuel injection start of injection time for a cylinder cycle, fuel injection amount, end of injection time, camshaft timing adjustments, or an amount of energy that is supplied to a glow plug for the cylinder. The various actuators are adjusted according to the outputs of the tables or functions.

In this way, the compression ratios and/or compression factors that were determined for each cylinder at 310 may be the basis for adjusting one or more actuators that may adjust pressure in the non-reference cylinders. Location of peak pressure and the value of peak pressure for each of the non-reference cylinders may be adjusted in this way by correlating the pressures in each non-reference cylinder to the pressure in the reference cylinder via deceleration rates of the engine. In other words, pressures in the non-reference cylinders may be adjusted responsive to relative compression factors or compression ratios between the engine cylinders. Method 300 proceeds to exit.

At 306, method 300 judges if it is desired for compression ratio factors and/or compression ratios for non-reference cylinders to be determined. The compression ratio factors and/or compression ratios may be determined while the engine is on an assembly line after an engine is manufactured and before delivery to the end customer. Further, the compression ratio factors may be determined when the vehicle is being serviced or "in service." A request to determine the compression ratio factors may be made via a technician via a human/machine interface. If method 300 judges that it is desired for compression ratio factors and/or compression ratios to be determined, the answer is yes and method 300 proceeds to 308. Otherwise, the answer is no and method 300 proceeds to 320.

At 320, method 300 maintains the compression ratio factors and/or compression ratios that may already be stored in controller memory. For example, compression ratio factors determined at an assembly factory may be maintained if there is no desire to determine compression ratio factors. Method 300 proceeds to exit.

At 308, method 300 rotates the engine crankshaft via an electric machine for a first predetermined number of rotations while fuel is not injected to the engine and while a de-compression valve is activated (e.g., the cylinder is being decompressed). By rotating the engine crankshaft when the de-compression valve is activated, method 300 may be able to determine baseline engine deceleration rates for each cylinder. Alternatively, method 300 may determine how long it takes to rotate a cylinder through the cylinder's compression stroke as a way of estimating a compression factor for the cylinder.

Method 300 may also rotate the engine crankshaft via the electric machine for a second predetermined number of rotations while fuel is not injected to the engine and while the de-compression valve is not activated after or before rotating the crankshaft for the first predetermined number of rotations. By rotating the engine crankshaft when the de-compression valve is activated, method 300 may be able to determine engine deceleration rates for each cylinder operating at the cylinder's present cylinder compression ratio. Alternatively, method 300 may determine how long it takes to rotate a cylinder through the cylinder's compression stroke as a way of estimating a compression factor for the cylinder.

At 310, method 300 determines a deceleration rate of the engine during each compression stroke of each cylinder to determine the cylinder compression factors. For example, method 300 may determine that the engine decelerates at a rate of X crankshaft degrees/second during a compression stroke of cylinder number one during a crankshaft interval that extends from 90 crankshaft degrees before top-dead-center (TDC) compression stroke of cylinder number one to TDC cylinder number one during the cylinder cycle of cylinder number one. The engine deceleration rate may be determined via observed crankshaft positions. The engine deceleration rates may be determined for conditions when the de-compression valve is activated and when the de-compression valve is deactivated. The compression factors for the engine cylinders may be determined from the engine deceleration rates of the cylinders. In one example, the engine deceleration rate during a compression stroke of the reference cylinder is determined. Next, engine deceleration rates for each of the other engine cylinders are determined and the engine deceleration rate for each particular cylinder is divided by the deceleration rate of the reference cylinder to determine compression factors for each cylinder. For example, if cylinder number one is the reference cylinder and the engine deceleration rate for cylinder number one is X, then the compression factor for cylinder number two may be determined via dividing the deceleration rate of the engine for cylinder number two Y by X.

Alternatively, method 300 may determine the amount of time it takes to rotate a cylinder through the cylinder's compression stroke as a way of estimating a compression factor for the cylinder. In one example, the amount of time it takes the engine crankshaft to rotate through a compression stroke of the reference cylinder is determined. Next, amounts of time for rotating the engine through each of the compression strokes is determined and the amount of time for the engine to rotate each cylinder through its compression stroke is divided by the amount of time it takes the engine to rotate through the compression stroke of the reference cylinder. For example, if cylinder number one is the reference cylinder and the amount of time it takes to rotate the engine through the compression stroke of cylinder number one is B seconds, then the compression factor for cylinder number two may be determined via dividing the amount of time it takes the engine to rotate through the compression stroke of cylinder number two A by B.

In another alternative, method 300 may estimate compression ratios for each of the cylinders according to the deceleration rate of the reference cylinder. For example, in a case where cylinder number one is the reference cylinder, the compression ratio of cylinder number one may be determined via measuring the change in cylinder pressure from the crankshaft angle of intake valve closing (IVC) of cylinder number one to TDC of the compression stroke of cylinder number one. The engine deceleration rate for cylinder number one is also determined during the compression stroke of cylinder number one and the compression ratios of non-reference cylinders may be estimated according to the relationship between the engine deceleration rate for cylinder number one and the compression ratio determined for cylinder number one. In one example, the engine deceleration rates for each of the non-reference cylinders are determined and the differences between the engine deceleration rate of the reference cylinder and the engine deceleration rate of the non-reference cylinders is determined. The difference in engine deceleration rate is then applied to reference or index a table of empirically determined cylinder compression ratio adjustments that outputs a compression ratio adjustment. The compression ratio adjustment is then applied to the compression ratio of the reference cylinder to determine the compression ratio of the non-reference cylinder.

For example, if cylinder number one is the reference cylinder and it is determined to have a compression ratio of 18:1 and the engine deceleration rate for cylinder number one is Z crankshaft degrees/second, then the compression ratio for cylinder number two may be determined from the engine deceleration rate for cylinder number two. In particular, if the engine deceleration rate for cylinder number two is W crankshaft/second, then the difference in engine deceleration rate is Z-W. The result of Z-W may be used to index or reference a table of empirically determined cylinder compression ratio adjustments that outputs a value of a compression ratio adjustment for cylinder number two (e.g., Q=0.05). The estimated compression ratio for cylinder number two is then 18:1+0.05=18.05:1.

The cylinder compression ratios for non-reference cylinders may also be determined with the de-compression valves of the non-reference cylinders being deactivated. The cylinder compression ratios for non-reference cylinders may be determined as previously described, except their de-compression valves are deactivated when engine deceleration rates are determined. Further, cylinder compression factors for the reference and non-reference cylinders may be determined as previously described, except their de-compression valves are deactivated when engine deceleration rates are determined. The engine deceleration rates captured during the compression strokes of cylinder number two may be referred to as the engine deceleration rate for cylinder number two with the de-compression valve open (e.g., activated) and the engine deceleration rate for cylinder number two with the de-compression valve closed (e.g., deactivated). Deceleration rates for other engine cylinders may be determined in a similar way. Method 300 may compare cylinder compression ratios with the de-compression valves activated to cylinder compression ratios or factors with the de-compression valves deactivated. If there is little difference between the compression ratios or factors, then method 300 may assume de-compression valve degradation or degradation in the present procedure. Method 300 proceeds to 312.

At 312, method 300 judges if the compression factors for each of the non-reference cylinders has been determined. If so, method 300 proceeds to 314. If not, method 300 returns to 306 where engine rotation and determination of compression factors may continue.

At 314, method 300 stored the compression factors in controller memory for subsequent use by the controller. Method 300 proceeds to exit.

In this way, pressure observed in a reference cylinder may be the basis for adjusting pressures in non-reference cylinders. Engine deceleration rates observed during compression strokes of non-reference cylinders may be the basis for determining compression ratios or compression factors of non-reference cylinders.

Thus, the method of FIG. 3 may provide for an engine operating method, comprising: adjusting a cylinder pressure control actuator of an engine via a controller based on a cylinder compression factor estimated from a deceleration rate of the engine. The engine method further comprises rotating the engine via an electric machine while determining the deceleration rate of the engine. The engine method further comprises rotating the engine without injecting fuel to the engine. The engine method further comprises rotating the engine with a de-compression valve activated. The engine method includes where the cylinder compression ratio is determined from the deceleration rate of the engine while the cylinder is on a compression stroke. The engine method includes where the cylinder compression ratio is further determined from a pressure in a reference cylinder. The engine method includes where the reference cylinder is an only cylinder of the engine that includes a pressure sensor. The engine method includes where the cylinder pressure control actuator is a fuel injector.

The method of FIG. 3 also provides for an engine operating method, comprising: rotating an engine via a starter with a de-compression valve activated; rotating the engine via the starter with the de-compression valve deactivated; and adjusting a cylinder pressure control actuator of an engine via a controller based on a cylinder compression factor estimated from a deceleration rate of the engine while rotating the engine with the de-compression valve activated and deactivated. The engine method includes where the de-compression valve is an exhaust valve. The engine method further comprises not injecting fuel to the engine while rotating the engine with the de-compression valve activated. The engine method includes where the cylinder pressure control actuator is adjusted when the engine is combusting fuel. The engine method includes where the cylinder pressure control actuator is a fuel injector. The engine method further comprises determining a compression factor for a cylinder according to the deceleration rate of the engine. The engine method further comprises determining the compression factor for the cylinder according to a pressure within a reference cylinder.

Referring now to FIG. 4, an example prophetic engine operating sequence for an engine is shown. The operating sequence of FIG. 4 may be produced via the system of FIGS. 1 and 2 executing instructions of the method described in FIG. 3. The plots of FIG. 4 are aligned in time and occur at the same time. Vertical markers at t0-t3 indicate times of particular interest during the sequence.

The first plot from the top of FIG. 4 represents engine starter state versus time. Trace 402 represents engine starter state and the engine starter is off and not rotating the engine crankshaft when trace 402 is at a low level near the horizontal axis. The engine starter is on and rotating the engine crankshaft when trace 402 is at a higher level near the vertical axis arrow. The vertical axis represents engine starter state. The horizontal axis represents engine position and engine position is indicated along the horizontal axis.

The second plot from the top of FIG. 4 represents a position of the piston of cylinder number one versus time. Trace 404 represents the position of the piston of cylinder number one. The vertical axis represents a position of the piston of cylinder number one. The horizontal axis represents engine position and time increases from the left side to right side of the figure. The vertical bars along the horizontal axis separate the strokes of cylinder number one. Cylinder number one compression stroke is indicated by C. Cylinder number one power or expansion stroke is indicated by P. Cylinder number one intake stroke is indcted by I. Cylinder number one exhaust stroke is indicated by E. The engine deceleration rate is determined in crankshaft region 450 to determine the engine deceleration rate for cylinder number one.

The third plot from the top of FIG. 4 represents a position of the piston of cylinder number two versus time. Trace 406 represents the position of the piston of cylinder number two. The vertical axis represents a position of the piston of cylinder number two. The horizontal axis represents engine position and time increases from the left side to right side of the figure. The vertical bars along the horizontal axis separate the strokes of cylinder number two. Cylinder number two compression stroke is indicated by C. Cylinder number two power or expansion stroke is indicated by P. Cylinder number two intake stroke is indcted by I. Cylinder number two exhaust stroke is indicated by E. The engine deceleration rate is determined in crankshaft region 451 to determine the engine deceleration rate for cylinder number two.

The fourth plot from the top of FIG. 4 represents a position of the piston of cylinder number three versus time. Trace 408 represents the position of the piston of cylinder number three. The vertical axis represents a position of the piston of cylinder number three. The horizontal axis represents engine position and time increases from the left side to right side of the figure. The vertical bars along the horizontal axis separate the strokes of cylinder number three. Cylinder number three compression stroke is indicated by C. Cylinder number three power or expansion stroke is indicated by P. Cylinder number three intake stroke is indcted by I. Cylinder number three exhaust stroke is indicated by E. The engine deceleration rate is determined in crankshaft region 452 to determine the engine deceleration rate for cylinder number three.

The fifth plot from the top of FIG. 4 represents a position of the piston of cylinder number four versus time. Trace 410 represents the position of the piston of cylinder number one. The vertical axis represents a position of the piston of cylinder number four. The horizontal axis represents engine position and time increases from the left side to right side of the figure. The vertical bars along the horizontal axis separate the strokes of cylinder number four. Cylinder number four compression stroke is indicated by C. Cylinder number four power or expansion stroke is indicated by P. Cylinder number four intake stroke is indcted by I. Cylinder number four exhaust stroke is indicated by E. The engine deceleration rate is determined in crankshaft region 453 to determine the engine deceleration rate for cylinder number four.

The sixth trace from the top of FIG. 4 is a plot of de-compression valve states for cylinders 1-4. The vertical axis represents de-compression valves states and the de-compression valves are closed when trace 412 is at a level near the vertical axis arrow. The de-compression valves are open (e.g., releasing pressure in cylinders) when trace 412 is at a lower level near the horizontal axis. Trace 412 represents state of de-compression valves of cylinders 1-4.

At time t0, the engine is stopped (not combusting and not rotating) and it is not being cranked (e.g., rotated under power provided via an electric machine or starter). The de-compression valves for cylinders 1-4 are closed so that pressure in the cylinder is maintained when the cylinder rotate through their respective strokes. The engine is stopped such that cylinder number one is part way through its compression stroke.

At the time t1, a compression factor determination sequence begins and the engine crankshaft starts rotating via a starter (not shown), which causes the pistons of cylinders 1-4 to begin moving. The de-compression valves of cylinders 1-4 are also opened so that the engine deceleration rates for cylinders 1-4 with the de-compression valves open may be determined.

Between time t1 and time t2, the starter continues to rotate the crankshaft and pistons in the cylinders change and the cylinders move through their various strokes. The de-compression valves remain open and engine deceleration rates for cylinders 1-4 are determined. The engine cylinder deceleration rates for cylinders 1-4 may be averaged for a plurality of cycles of the engine.

At the time t2, the compression factor determination sequence continues and the engine crankshaft remains rotating via a starter (not shown). The de-compression valves of cylinders 1-4 are closed so that the engine deceleration rates for cylinders 1-4 with the de-compression valves closed may be determined.

Between time t2 and time t3, the starter continues to rotate the crankshaft and pistons in the cylinders change and the cylinders move through their various strokes. The de-compression valves remain closed and engine deceleration rates for cylinders 1-4 are determined. The engine cylinder deceleration rates for cylinders 1-4 may be averaged for a plurality of cycles of the engine. The compression factor determination sequence ends at time t3.

In this way, compression factors may be determined for each of the engine's cylinders. The compression factors may be applied subsequently when the engine is operating and combusting fuel to control cylinder pressures.

Referring now to FIG. 5, a bar plot of engine cylinder compression ratio differences relative to cylinder number one are shown. The bars 501-508 graphically represent compression ratio differences for the cylinders relative to cylinder number one. The cylinder numbers that correspond to each of the indicating bars are listed along the horizontal axis. The compression ratio difference values relative to cylinder number one are indicated along the vertical axis.

The bar for cylinder number one indicates a difference with cylinder number one of zero percent since the compression ratio of cylinder number one is compared with itself. The bars for cylinder numbers two, four, seven, and 8 are also indicated with zero difference. The bars for cylinder numbers three, five, and six indicate small differences between the compression ratios of these cylinders and the compression ratio of cylinder number one. The compression factors of cylinders three, five, and six would indicate the compression ratio differences relative to the compression ratio of cylinder number one.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
adjusting a cylinder pressure control actuator of an engine via a controller based on a cylinder compression factor estimated from a deceleration rate of the engine.

2. The engine method of claim 1, further comprising rotating the engine via an electric machine while determining the deceleration rate of the engine.

3. The engine method of claim 2, further comprising rotating the engine without injecting fuel to the engine.

4. The engine method of claim 3, further comprising rotating the engine with a de-compression valve activated.

5. The engine method of claim 1, where the cylinder compression factor is determined from the deceleration rate of the engine while the cylinder is on a compression stroke.

6. The engine method of claim 5, where the cylinder compression factor is further determined from a pressure in a reference cylinder.

7. The engine method of claim 6, where the reference cylinder is an only cylinder of the engine that includes a pressure sensor.

8. The engine method of claim 1, where the cylinder pressure control actuator is a fuel injector.

9. An engine operating method, comprising:
rotating an engine via a starter with a de-compression valve activated;
rotating the engine via the starter with the de-compression valve deactivated; and
adjusting a cylinder pressure control actuator of an engine via a controller based on a cylinder compression factor estimated from a deceleration rate of the engine while rotating the engine with the de-compression valve deactivated.

10. The engine method of claim 9, where the de-compression valve is an exhaust valve.

11. The engine method of claim 9, further comprising not injecting fuel to the engine while rotating the engine with the de-compression valve deactivated.

12. The engine method of claim 9, where the cylinder pressure control actuator is adjusted when the engine is combusting fuel.

13. The engine method of claim 12, where the cylinder pressure control actuator is a fuel injector.

14. The engine method of claim 9, further comprising determining the compression ratio for the cylinder according to the deceleration rate of the engine.

15. The engine method of claim 14, further comprising determining the compression factor for the cylinder according to a pressure within a reference cylinder.

16. An engine system, comprising:
a diesel engine including a cylinder with a pressure sensor and plurality of cylinders without pressure sensors, the diesel engine also including a plurality of fuel injectors; and
a controller including executable instructions stored in non-transitory memory to adjust timing of at least one of the plurality of fuel injectors in response to a compression factor that is related to a deceleration rate of the diesel engine.

17. The engine system of claim 16, where the cylinder is a reference cylinder that is a basis for determining compression factors for cylinders of the diesel engine other than the reference cylinder.

18. The engine system of claim 16, where the deceleration rate is measured during a compression stroke of a cylinder.

19. The engine system of claim 16, where adjusting timing of the at least one of the plurality of fuel injectors includes adjusting a start of injection time for a cylinder for a cycle of the engine.

20. The engine system of claim 19, where adjusting timing of the at least one of the plurality of fuel injectors includes adjusting an end of injection time for the cylinder for the cycle of the engine.

* * * * *